(12) United States Patent
Feng et al.

(10) Patent No.: US 12,346,736 B2
(45) Date of Patent: Jul. 1, 2025

(54) SYSTEMS AND METHODS FOR DATA STORAGE AND COMPUTING

(71) Applicant: ZHEJIANG DAHUA TECHNOLOGY CO., LTD., Zhejiang (CN)

(72) Inventors: Guobao Feng, Hangzhou (CN); Chengxiang Lu, Hangzhou (CN); Bin Wang, Hangzhou (CN); Songlou Hong, Hangzhou (CN); Jianfeng Cai, Hangzhou (CN)

(73) Assignee: ZHEJIANG DAHUA TECHNOLOGY CO., LTD., Zhejiang (CN)

( * ) Notice: Subject to any disclaimer, the term of this patent is extended or adjusted under 35 U.S.C. 154(b) by 510 days.

(21) Appl. No.: 17/662,228

(22) Filed: May 5, 2022

(65) Prior Publication Data

US 2022/0261175 A1    Aug. 18, 2022

Related U.S. Application Data

(63) Continuation of application No. PCT/CN2021/122992, filed on Oct. 11, 2021.

(30) Foreign Application Priority Data

Nov. 17, 2020  (CN) .......................... 202011288120.8
Jan. 19, 2021  (CN) .......................... 202110069514.2

(51) Int. Cl.
*G06F 3/06*      (2006.01)
*G06F 9/50*      (2006.01)
(52) U.S. Cl.
CPC ............ *G06F 9/505* (2013.01); *G06F 3/0613* (2013.01); *G06F 3/0631* (2013.01);
(Continued)

(58) Field of Classification Search
CPC ...... G06F 9/505; G06F 3/0613; G06F 3/0631; G06F 3/0638; G06F 3/067; G06F 3/0608; G06F 3/061
See application file for complete search history.

(56) References Cited

U.S. PATENT DOCUMENTS 9,172,396 B1   10/2015  Jung et al.
10,635,336 B1   4/2020  He et al.
(Continued)

FOREIGN PATENT DOCUMENTS

CN    104461396 A    3/2015
CN    105138289 A   12/2015
(Continued)

OTHER PUBLICATIONS

International Search Report in PCT/CN2021/122992 mailed on Jan. 14, 2022, 4 pages.
(Continued)

*Primary Examiner* — Brian W Wathen
(74) *Attorney, Agent, or Firm* — METIS IP LLC

(57) ABSTRACT

Systems and methods for data storage are provided. The systems may include one or more storage modules and one or more computing modules. The systems may obtain data to be processed. The systems may determine a required storage bandwidth based on the data to be processed. The systems may determine a distribution mode of a current computing bandwidth of the one or more computing modules based on a current storage bandwidth of the one or more storage modules and the required storage bandwidth.

18 Claims, 11 Drawing Sheets

(52) U.S. Cl.
CPC ............ *G06F 3/0638* (2013.01); *G06F 3/067* (2013.01); *G06F 2209/501* (2013.01); *G06F 2209/503* (2013.01)

(56) References Cited

U.S. PATENT DOCUMENTS

| | | | | |
|---|---|---|---|---|
| 12,056,579 | B1* | 8/2024 | Mattar | ................... G06N 20/00 |
| 2012/0185648 | A1 | 7/2012 | Benhase et al. | |
| 2016/0248676 | A1 | 8/2016 | Thanasekaran | |
| 2018/0004447 | A1* | 1/2018 | Oohira | ................... G06F 3/067 |
| 2018/0081581 | A1* | 3/2018 | Miyamoto | .............. G06F 3/061 |
| 2018/0129425 | A1 | 5/2018 | Park et al. | |
| 2020/0133533 | A1 | 4/2020 | Zhao et al. | |
| 2021/0049042 | A1* | 2/2021 | Suh | ......................... G06F 9/505 |
| 2021/0173824 | A1 | 6/2021 | Chen | |
| 2021/0374319 | A1* | 12/2021 | Gibson | ................. G06F 9/4881 |
| 2021/0389886 | A1* | 12/2021 | Purushothaman | ...... G06F 3/067 |
| 2022/0121361 | A1* | 4/2022 | Kamran | .................. G06F 3/067 |
| 2022/0131931 | A1* | 4/2022 | Bikumala | ............ G06F 16/2379 |
| 2022/0147269 | A1 | 5/2022 | Feng et al. | |
| 2022/0147401 | A1* | 5/2022 | Wigglesworth | ...... G06F 9/5083 |

FOREIGN PATENT DOCUMENTS

| | | |
|---|---|---|
| CN | 105159610 A | 12/2015 |
| CN | 109656855 A | 4/2019 |
| CN | 109683827 A | 4/2019 |
| CN | 109787638 A | 5/2019 |
| CN | 110837343 A | 2/2020 |
| CN | 111158907 A | 5/2020 |
| CN | 111443870 A | 7/2020 |
| CN | 111737062 A | 10/2020 |
| CN | 111831452 A | 10/2020 |
| CN | 112181293 A | 1/2021 |
| CN | 112394882 A | 2/2021 |
| CN | 112948300 A | 6/2021 |

OTHER PUBLICATIONS

Written Opinion in PCT/CN2021/122992 mailed on Jan. 14, 2022, 5 pages.
First Office Action in Chinese Application No. 202011288120.8 mailed on Dec. 14, 2021, 9 pages.
First Office Action in Chinese Application No. 202110069514.2 mailed on Jul. 20, 2022, 16 pages.
The Extended European Search Report in European Application No. 21887859.3 mailed on Jan. 24, 2023, 8 pages.

* cited by examiner

1100

Determining a current storage bandwidth of N storage module(s) and a current computing bandwidth of M computing module(s) based on data to be processed — 1110

Adjusting a count of the M computing module(s) based on the current storage bandwidth and the current computing bandwidth, such that K computing module(s) of the M computing module(s) is used to process the data to be processed to obtain target data — 1120

Storing the target data in the N storage module(s) — 1130

FIG. 11

SYSTEMS AND METHODS FOR DATA STORAGE AND COMPUTING

CROSS-REFERENCE TO RELATED APPLICATIONS

This application is a Continuation of International Application No. PCT/CN2021/122992, filed on Oct. 11, 2021, which claims priority of Chinese Patent Application No. 202011288120.8 filed on Nov. 17, 2020 and Chinese Patent Application No. 202110069514.2 filed on Jan. 19, 2021, the entire contents of which are incorporated herein by reference.

TECHNICAL FIELD

The present disclosure generally relates to communication technology, and in particular, to systems and methods for data storage and computing.

BACKGROUND

With the development of electronic and communication technology, more and more electronic devices (e.g., processing devices) are widely used. Under different situations or scenarios, required storage capacities and/or required computing capacities are different. Therefore, it is desirable to provide systems and methods for effectively balancing storage performance and computing performance of the processing devices, thereby improving both the storage performance and the computing performance.

SUMMARY

In an aspect of the present disclosure, a system is provided. The system may include one or more storage modules, one or more computing modules, at least one storage device including a set of instructions, and at least one processor in communication with the at least one storage device. When executing the set of instructions, the at least one processor may be directed to cause the system to perform following operations. The operations may include obtaining data to be processed. The operations may also include determining a required storage bandwidth based on the data to be processed. The operations may further include determining a distribution mode of a current computing bandwidth of the one or more computing modules based on a current storage bandwidth of the one or more storage modules and the required storage bandwidth.

In some embodiments, the required storage bandwidth may include at least one of a first storage bandwidth that the data would occupy, or a second storage bandwidth that an analysis result of the data would occupy.

In some embodiments, the determining a required storage bandwidth based on the data to be processed may include determining the required storage bandwidth based on at least one of a parameter associated with a capture device used to capture the data to be processed or historical data within a predetermined time period.

In some embodiments, the determining a distribution mode of a current computing bandwidth of the one or more computing modules based on a current storage bandwidth of the one or more storage modules and the required storage bandwidth may include determining whether the required storage bandwidth is larger than the current storage bandwidth; and determining the distribution mode of the current computing bandwidth based on the determination result.

In some embodiments, the determining the distribution mode of the current computing bandwidth based on the determination result may include in response to a determination that the required storage bandwidth is less than or equal to the current storage bandwidth, keeping the distribution mode of the current computing bandwidth of the one or more computing modules unchanged.

In some embodiments, the determining the distribution mode of the current computing bandwidth based on the determination result may include in response to a determination that the required storage bandwidth is larger than the current storage bandwidth, allocating a portion of the current computing bandwidth to be used to compress the data to be processed.

In some embodiments, the determining the distribution mode of the current computing bandwidth based on the determination result may include in response to a determination that the required storage bandwidth is larger than the current storage bandwidth, stopping a portion of the current computing bandwidth, such that an updated required storage bandwidth is no larger than the current storage bandwidth.

In some embodiments, the determining the distribution mode of the current computing bandwidth based on the determination result may include in response to determining that the required storage bandwidth is less than or equal to the current storage bandwidth, determining a required computing bandwidth based on the data to be processed; determining whether the current computing bandwidth is greater than the required computing bandwidth; and in response to a determination that the current computing bandwidth is greater than the required computing bandwidth, allocating a portion of the current computing bandwidth to be used to compress the data to be processed.

In some embodiments, the determining the distribution mode of the current computing bandwidth based on the determination result may include in response to determining that the required storage bandwidth is less than or equal to the current storage bandwidth, determining a required computing bandwidth based on the data to be processed; determining whether the current computing bandwidth is greater than the required computing bandwidth; and in response to a determination that the current computing bandwidth is less than the required computing bandwidth, allocating a computing bandwidth that is previously allocated to be used to compress the data to be processed back to the current computing bandwidth.

In some embodiments, the data to be processed may include real-time video data.

In some embodiments, the one or more storage modules and the one or more computing modules may be integrated into an integrated storage-computing device.

In some embodiments, the one or more storage modules may be connected to the at least one processor via a first connecting component. The one or more computing modules may be connected to the at least one processor via a second connecting component.

In some embodiments, the at least one processor may include a first processor and a second processor in communication with each other. The one or more storage modules may be connected to the first processor and the second processor respectively via a first connecting component. The one or more computing modules may be connected to the first processor and the second processor respectively via a second connecting component.

In another aspect of the present disclosure, a method is provided. The method may be implemented on a computing device including at least one storage device and at least one processor. The method may include obtaining data to be processed. The method may also include determining a required storage bandwidth based on the data to be processed. The method may further include determining a distribution mode of a current computing bandwidth of one or more computing modules based on a current storage bandwidth of one or more storage modules and the required storage bandwidth.

In some embodiments, the required storage bandwidth may include at least one of a first storage bandwidth that the data would occupy, or a second storage bandwidth that an analysis result of the data would occupy.

In some embodiments, the determining a required storage bandwidth based on the data to be processed may include determining the required storage bandwidth based on at least one of a parameter associated with a capture device used to capture the data to be processed or historical data within a predetermined time period.

In some embodiments, the determining a distribution mode of a current computing bandwidth of the one or more computing modules based on a current storage bandwidth of the one or more storage modules and the required storage bandwidth may include determining whether the required storage bandwidth is larger than the current storage bandwidth; and determining the distribution mode of the current computing bandwidth based on the determination result.

In some embodiments, the determining the distribution mode of the current computing bandwidth based on the determination result may include in response to a determination that the required storage bandwidth is less than or equal to the current storage bandwidth, keeping the distribution mode of the current computing bandwidth of the one or more computing modules unchanged.

In some embodiments, the determining the distribution mode of the current computing bandwidth based on the determination result may include in response to a determination that the required storage bandwidth is larger than the current storage bandwidth, allocating a portion of the current computing bandwidth to be used to compress the data to be processed.

In some embodiments, the determining the distribution mode of the current computing bandwidth based on the determination result may include in response to a determination that the required storage bandwidth is larger than the current storage bandwidth, stopping a portion of the current computing bandwidth, such that an updated required storage bandwidth is no larger than the current storage bandwidth.

In some embodiments, the determining the distribution mode of the current computing bandwidth based on the determination result may include in response to determining that the required storage bandwidth is less than or equal to the current storage bandwidth, determining a required computing bandwidth based on the data to be processed; determining whether the current computing bandwidth is greater than the required computing bandwidth; and in response to a determination that the current computing bandwidth is greater than the required computing bandwidth, allocating a portion of the current computing bandwidth to be used to compress the data to be processed.

In some embodiments, the determining the distribution mode of the current computing bandwidth based on the determination result may include in response to determining that the required storage bandwidth is less than or equal to the current storage bandwidth, determining a required computing bandwidth based on the data to be processed; determining whether the current computing bandwidth is greater than the required computing bandwidth; and in response to a determination that the current computing bandwidth is less than the required computing bandwidth, allocating a computing bandwidth that is previously allocated to be used to compress the data to be processed back to the current computing bandwidth.

In some embodiments, the data to be processed may include real-time video data.

In some embodiments, the one or more storage modules and the one or more computing modules may be integrated into an integrated storage-computing device.

In some embodiments, the one or more storage modules may be connected to the at least one processor via a first connecting component. The one or more computing modules may be connected to the at least one processor via a second connecting component.

In some embodiments, the at least one processor may include a first processor and a second processor in communication with each other. The one or more storage modules may be connected to the first processor and the second processor respectively via a first connecting component. The one or more computing modules may be connected to the first processor and the second processor respectively via a second connecting component.

In another aspect of the present disclosure, a system is provided. The system may include an obtaining unit, a determination unit, and an adjustment unit. The obtaining module may be configured to obtain data to be processed. The determination module may be configured to determine a required storage bandwidth based on the data to be processed. The adjustment module may be configured to determine a distribution mode of a current computing bandwidth of one or more computing modules based on a current storage bandwidth of one or more storage modules and the required storage bandwidth.

In another aspect of the present disclosure, a non-transitory computer readable medium is provided. The non-transitory computer readable medium may include executable instructions that, when executed by at least one processor, direct the at least one processor to perform a method. The method may include obtaining data to be processed. The method may also include determining a required storage bandwidth based on the data to be processed. The method may further include determining a distribution mode of a current computing bandwidth of one or more computing modules based on a current storage bandwidth of one or more storage modules and the required storage bandwidth.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11 is a flowchart illustrating an exemplary process for data storage and computing according to some embodiments of the present disclosure.

DETAILED DESCRIPTION

Figure 1:
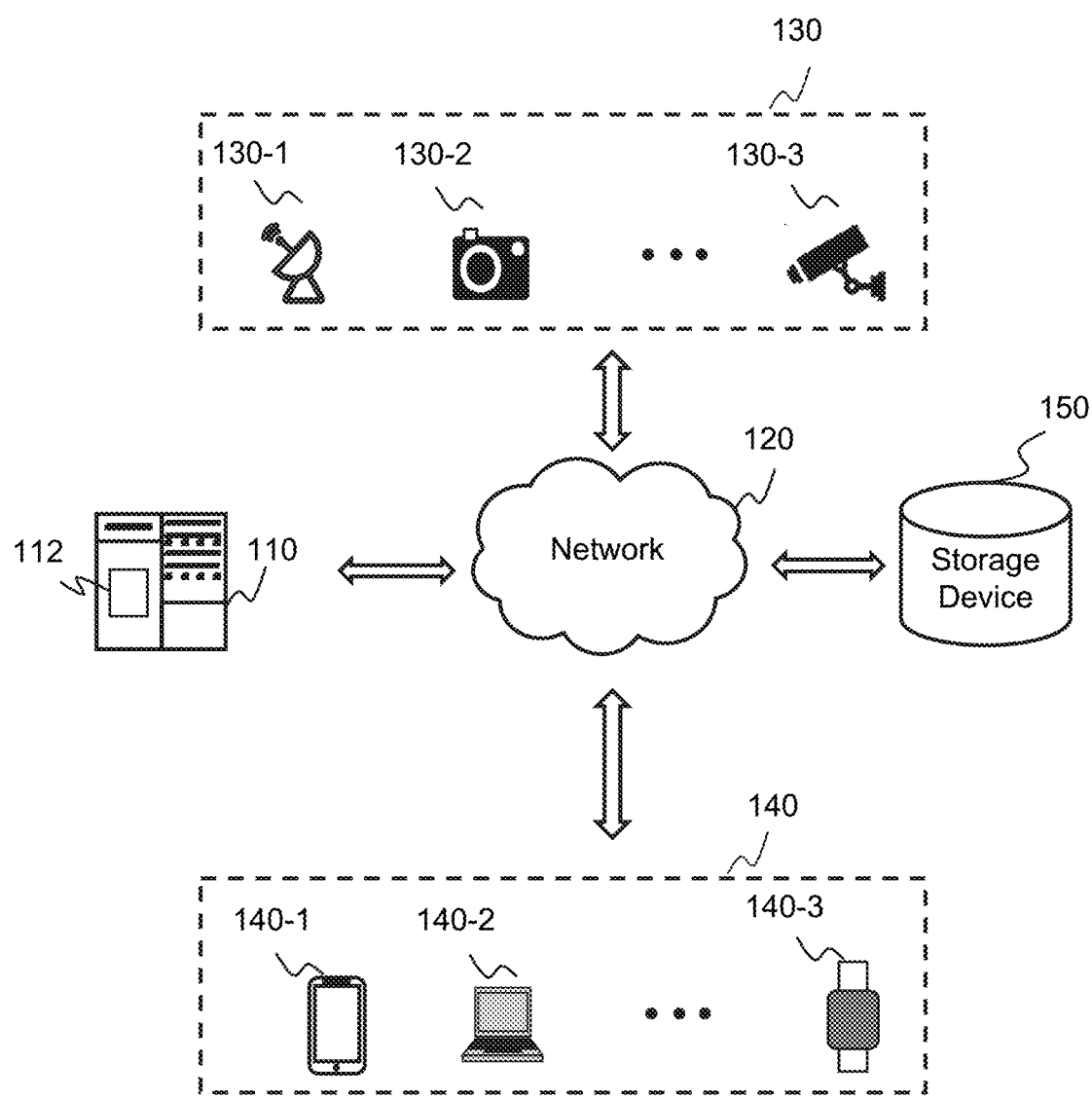
FIG. 1 is a schematic diagram illustrating an exemplary data processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression(s) if they may achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device(s). In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to a system and method for data storage and/or computing. The system may include one or more storage modules and one or more computing modules. The system may obtain data to be processed and determine a required storage bandwidth based on the data to be processed. The system may also determine a distribution mode of a current computing bandwidth of the one or more computing modules based on a current storage bandwidth of the one or more storage modules and the required storage bandwidth.

According to some embodiments of the present disclosure, the system may monitor the current storage bandwidth of the one or more storage modules and the data to be processed in real-time. The system may dynamically allocate the computing bandwidth of the one or more computing modules for optimizing the storage performance of the one or more storage modules. In such cases, the storage module(s) and the computing module(s) are implemented cooperatively, such that the storage module(s) can store more data (e.g., data to be stored and/or analysis result(s) of data to be analyzed) during a preset storage cycle in comparison of a situation that the storage module(s) and the computing module(s) are implemented separately and/or individually. In addition, the storage module(s) and the computing module(s) may be integrated into an integrated storage-computing device. The integrated storage-computing device may be communicatively connected to at least one processor (or controller) of the system, such that the storage module(s) and the computing module(s) can be controlled by the at least one processor (or controller) and implemented cooperatively for achieving the method described elsewhere in the present disclosure.

FIG. 1 a schematic diagram illustrating an exemplary data processing system according to some embodiments of the present disclosure. The data processing system 100 may be used as various systems (e.g., a communication system, a surveillance system, a monitoring system) and may be applied in various scenarios (e.g., traffic roads, residential buildings, office buildings, shopping malls, hospitals). For illustration purposes, the present disclosure is described with respect to a data processing system 100 applied in traffic monitoring. As illustrated in FIG. 1, the data processing system 100 may include a server 110, a network 120, a capture device 130, a terminal device 140, and a storage device 150.

The server 110 may be a single server or a server group. The server group may be centralized or distributed. For example, the server 110 may be a distributed system). In some embodiments, the server 110 may be local or remote. For example, the server 110 may access information and/or data stored in the capture device 130 via the network 120. As another example, the server 110 may be directly connected to capture device 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to data storage and computing to perform one or more functions described in the present disclosure. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the processing device 112 may include one or more storage modules, one or more computing modules, and at least one processor. In some embodiments, the at least one processor may execute instructions to cause the processing device 112 to perform operations described in the present disclosure. For example, the processing device 112 may obtain data to be processed. The processing device 112 may determine a required storage bandwidth based on the data to be processed. The processing device 112 may also determine a distribution mode of a current computing bandwidth of the one or more computing modules based on a current storage bandwidth of the one or more storage modules and the required storage bandwidth. Further, the processing device 112 may perform the storage and computing of the data to be processed according to the distribution mode of the current computing bandwidth.

In some embodiments, the one or more computing modules and/or the one or more storage modules may be integrated into one or more integrated storage-computing devices. For example, an integrated storage-computing device may include a storage module and a computing module. As another example, an integrated storage-computing device may include a storage module and two computing modules.

In some embodiments, the integrated storage-computing device may be part of the processing device 112. In some embodiments, the integrated storage-computing device may be a device independent from the processing device 112. The processing device 112 may be communicatively connected to the integrated storage-computing device to perform the storage function and the computing function cooperatively. For example, the integrated storage-computing device may be an external device of the processing device 112 (e.g., may be inserted into the processing device 112 as shown in FIGS. 9A-9C and 10). As another example, the integrated storage-computing device may be remote from the processed device 112. More descriptions regarding the connection mode between the processing device 112 and the integrated storage-computing device may be found elsewhere in the present disclosure (e.g., FIGS. 9A-9C and 10 and the descriptions thereof).

In some embodiment, the sever 110 may be unnecessary and all or part of the functions of the server 110 may be implemented by other components (e.g., the capture device 130, the terminal device 140) of the data processing system 100. For example, the processing device 112 may be integrated into the capture device 130 or the terminal device 140 and the functions of the processing device 112 may be implemented by the capture device 130 or the terminal device 140.

The network 120 may facilitate exchange of information and/or data for the data processing system 100. In some embodiments, one or more components (e.g., the server 110, the capture device 130, the terminal device 140, the storage device 150) of the data processing system 100 may transmit information and/or data to other component(s) of the data processing system 100 via the network 120. For example, the server 110 may obtain data to be processed from the capture device 130 and/or the storage device 150 via the network 120. As another example, the server 110 may transmit the processed data (e.g., an analysis result of the data to be processed) to the terminal device 140 for display via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth™ network, a ZigBee™ network, a near field communication (NFC) network, or the like, or any combination thereof.

The capture device 130 may be configured to acquire image data and/or video streaming data to be processed (e.g., to be stored and/or analyzed). In some embodiments, the capture device 130 may include a camera 130-1, a video recorder 130-2, an image sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-3 may include a Charge Coupled Device (CCD), a Complementary Metal Oxide Semiconductor (CMOS), or the like, or any combination thereof. In some embodiments, the capture device 130 may include a plurality of components each of which can acquire image(s) or video(s). For example, the capture device 130 may include a plurality of sub-cameras that can capture images or videos simultaneously. In some embodiments, the capture device 130 may transmit the acquired image data or video streaming data to one or more components (e.g., the server 110, the terminal device 140, the storage device 150) of the data processing system 100 via the network 120.

The terminal device 140 may be configured to receive information and/or data from the server 110, the capture device 130, and/or the storage device 150 via the network 120. For example, the terminal device 140 may receive processed data (e.g., an analysis result of the data to be processed) from the server 110. In some embodiments, the terminal device 140 may process information and/or data received from the server 110, the capture device 130, and/or the storage device 150 via the network 120. For example, the terminal device 140 may decode the videos received from the server 110 for display. In some embodiments, the terminal device 140 may provide a user interface via which a user may view information and/or input data and/or instructions to the data processing system 100. For example, the user may view the decoded videos via the user interface. As another example, the user may input an instruction associated with a required storage cycle of the one or more storage modules via the user interface. In some embodiments, the terminal device 140 may include a mobile phone 140-1, a computer 140-2, a wearable device 140-3, or the like, or any combination thereof. In some embodiments, the terminal device 140 may include a display that can display information in a human-readable form, such as text, image, audio, video, graph, animation, or the like, or any combination thereof. The display of the terminal device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the terminal device 140 may be connected to one or more components (e.g., the server 110, the capture device 130, the storage device 150) of the data processing system 100 via the network 120.

The storage device 150 may be configured to store data and/or instructions. The data and/or instructions may be obtained from, for example, the server 110, the capture device 130, the terminal device 140, and/or any other component of the data processing system 100. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the capture device 130, the terminal device 140) of the data processing system 100. One or more components of the data processing system 100 may access the data or instructions stored in the storage device 150 via the network 120. In some embodiments, the storage device 150 may be directly connected to or communicate with one or more components (e.g., the server 110, the capture device 130, the terminal device 140) of the data processing system 100. In some embodiments, the storage device 150 may be part of other components of the data processing system 100, such as the server 110, the capture device 130, or the terminal device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more components of the data processing system 100 may be integrated into one component or be omitted. For example, the capture device 130 may be part of the terminal device 140.

Figure 2:
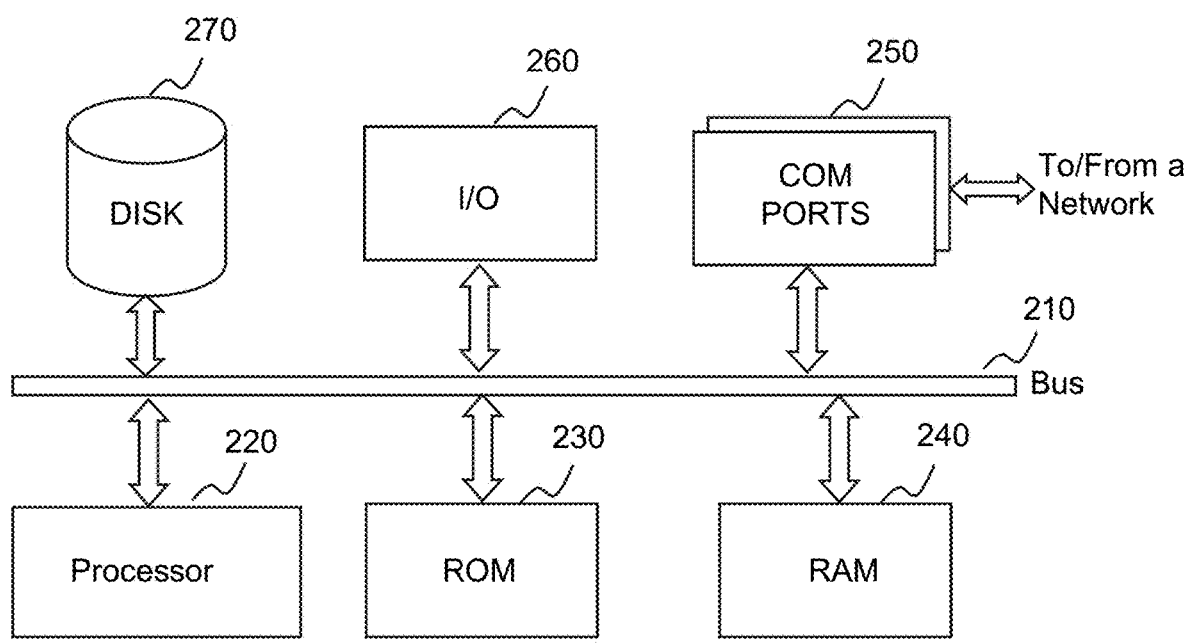
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device of the server 110 may be implemented on the computing device 200 and configured to perform functions of the processing device disclosed in this disclosure.

The computing device 200 may be used to implement any component of the data processing system 100 as described herein. For example, the processing device of the data processing system 100 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3A:
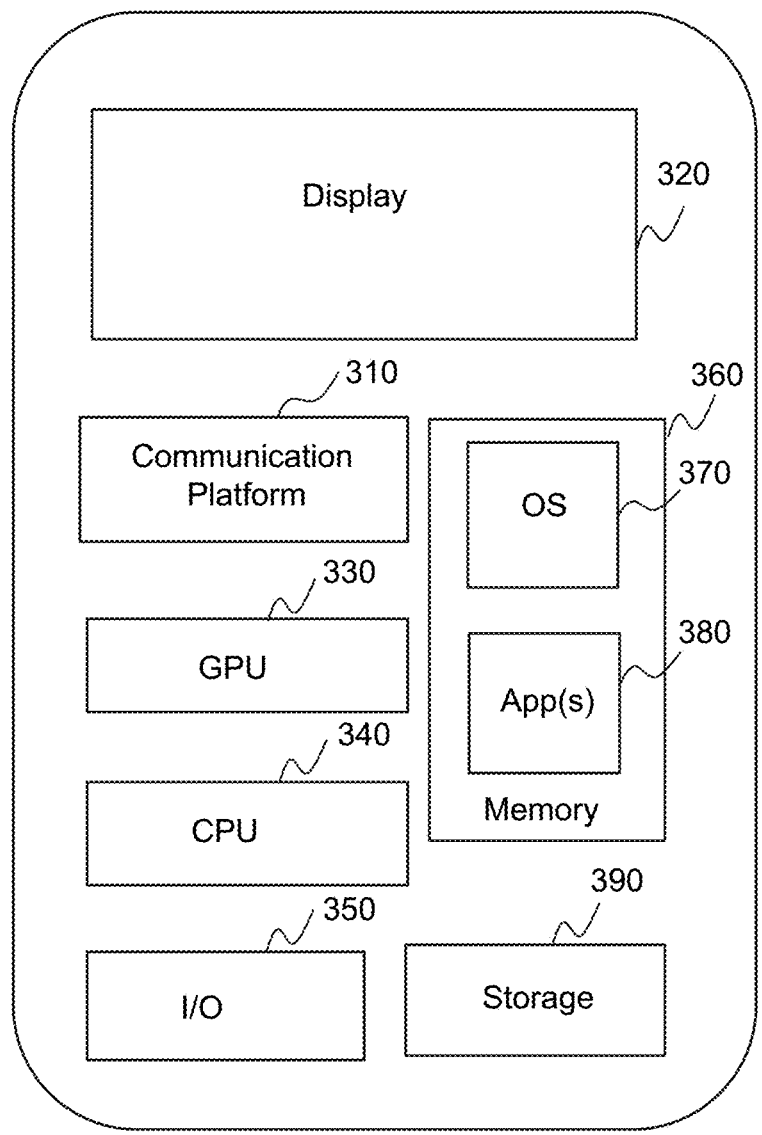
FIG. 3A is a schematic diagram illustrating exemplary hardware and/or software components of an exemplary terminal device according to some embodiments of the present disclosure.

FIG. 3A is a schematic diagram illustrating exemplary hardware and/or software components of an exemplary terminal device according to some embodiments of the present disclosure. In some embodiments, the processing device 112 or the terminal device 140 may be implemented on the terminal device 300A shown in FIG. 3A.

As illustrated in FIG. 3A, the terminal device 300A may include a communication platform 310, a display 320, a graphic processing unit (GPU) 330, a central processing unit (CPU) 340, an I/O 350, a memory 360, and a storage 390.

In some embodiments, any other suitable component, including but not limited to a system bus or a controller (not shown), may also be included in the terminal device 300A.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image processing or other information from the processing device. User interactions may be achieved via the I/O 350 and provided to the processing device and/or other components of the data processing system 100 via the network.

Figure 3B:
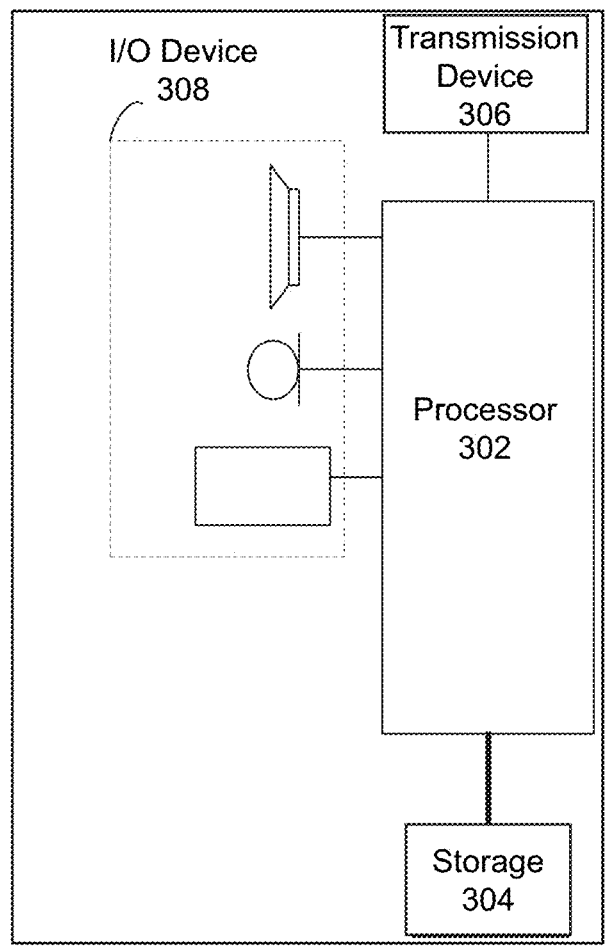
FIG. 3B is a schematic diagram illustrating exemplary hardware and/or software components of an exemplary terminal device according to some embodiments of the present disclosure.

FIG. 3B is a schematic diagram illustrating exemplary hardware and/or software components of an exemplary terminal device according to some embodiments of the present disclosure. The terminal device 300B may include a mobile device. In some embodiments, the processing device 112 or the terminal device 140 may be implemented on the terminal device 300B shown in FIG. 3B.

As shown in FIG. 3B, the terminal device 300B may include a processor 302, a storage device 304, a transmission device 306, and an I/O device 308. The processor 302 may include a microprocessor unit (MCU), a programmable logic device such as an FPGA, etc. The processor 302 may be similar to the CPU 340.

The storage device 304 may be configured to store computer programs, for example, computer programs corresponding to data storage and computing method of the present disclosure. The processor 302 may be configured to operate the computer programs stored in the storage device 304 for implementing various function applications and data processing to achieve the method of the present disclosure. The storage device 304 may be similar to the storage device 150 as described in FIG. 1.

The transmission device 306 may receive or send data via a network (e.g., the network 120). The transmission device 306 may include a network interface controller (NIC) which can connect to other network devices via a base station to communicate with the network. The transmission device 106 may include a radio frequency (RF) module which is used to communicate wirelessly with the network.

It should be noted that FIG. 3B is provided for illustration purposes and is not intended to be limiting. For example, one or more components may be added to the terminal device 300B or may be or omitted from the terminal device 300B. As another example, the terminal device 300B may include one or more additional components.

Figure 4:
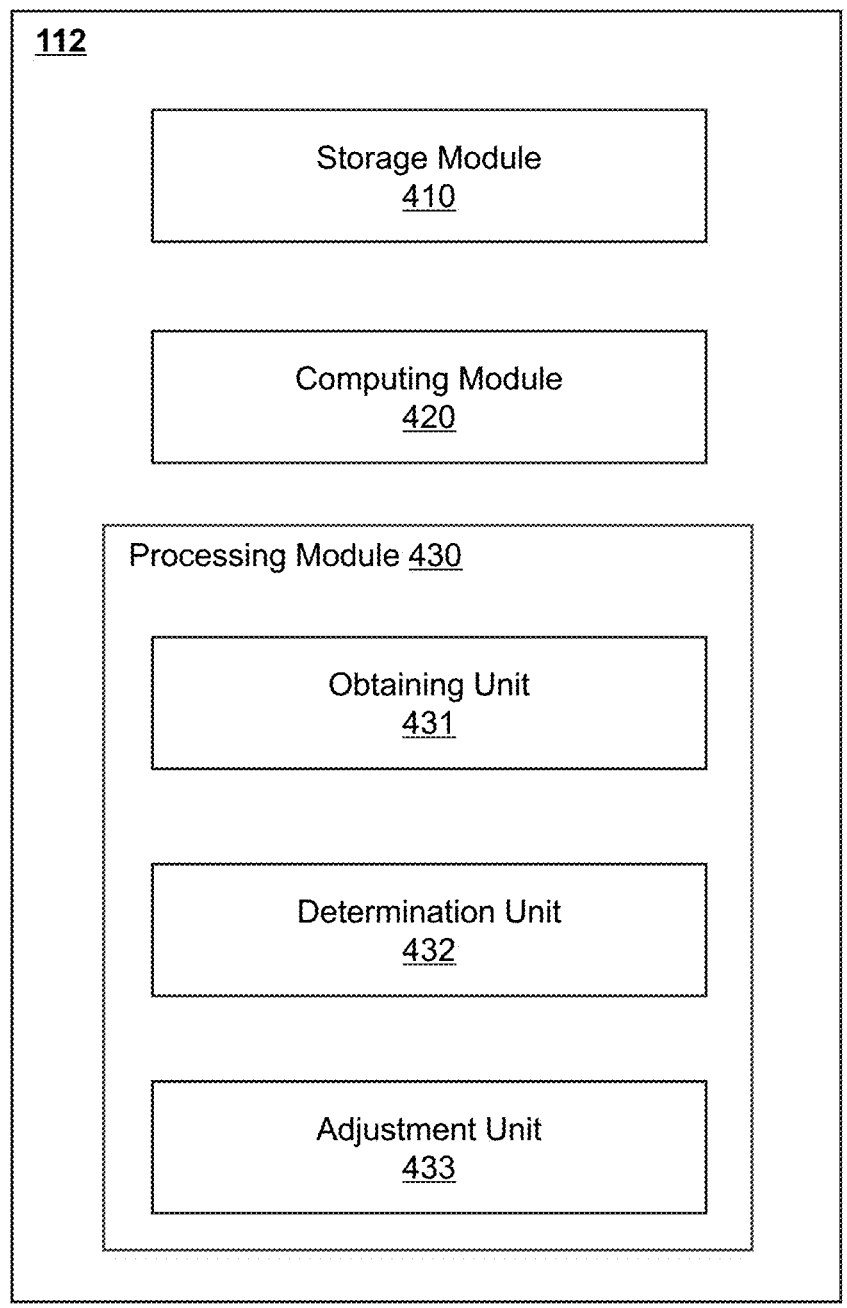
FIG. 4 is a schematic diagram illustrating an exemplary processing device according to some embodiments of the present disclosure.

FIG. 4 is a schematic diagram illustrating an exemplary processing device according to some embodiments of the present disclosure. As shown in FIG. 4, the processing device 112 may include a storage module 410, a computing module 420, and a processing module 430.

The storage module 410 may include a hardware device that can store data and/or information to be stored. For example, the storage module 410 may include a mass storage, for example, a magnetic disk, an optical disk, a solid-state drive (e.g., a hard disk), or the like, or a combination thereof.

The computing module 420 may include a hardware device that can analyze and/or compress data/information to be processed. In some embodiments, the computing module 420 may be controlled by the processing module 430 and not interfere with the operating of the processing module 430. In some embodiments, the computing module 420 may include a processor or controller. For example, the computing module 420 may include a smart card embedded with a microchip.

In some embodiments, as described in connection with FIG. 1, the storage module 410 and the computing module 420 may be external devices of the processing device 112. For example, the storage module 410 and the computing module 420 may be integrated into an integrated storage-computing device. The processing device 112 may be connected to the integrated storage-computing device for obtaining the storage resource and the computing resource from the integrated storage-computing device. More description regarding the integrated storage-computing device may be found elsewhere in the present disclosure (e.g., FIGS. 8-10 and the description thereof).

The processing module 430 may include an obtaining unit 431, a determination unit 432, and an adjustment unit 433.

The obtaining unit 431 may be configured to obtain data/information related to data storage and/or computing. For example, the obtaining unit 431 may obtain data to be processed from one or more components (e.g., the capture device 130, the storage device 150, the terminal device 140, an external storage device) associated with the data processing system 100. The data to be processed may include real-time data (e.g., real-time videos and/or real-time images) to be stored and/or analyzed, cached data to be analyzed, etc. More descriptions regarding the data to be processed may be found elsewhere in the present disclosure (e.g., operation 510 and the description thereof).

The determination unit 432 may be configured to determine a required storage bandwidth and/or a required computing bandwidth. For example, the determination unit 432 may determine the required storage bandwidth based on the data to be processed. The required storage bandwidth may include a first storage bandwidth that the data to be processed would occupy and/or a second storage bandwidth that an analysis result of the data to be processed would occupy. The determination unit 432 may determine the required storage bandwidth based on at least one of a parameter associated with a capture device (e.g., the captured device 130) used to capture the data to be processed or historical data within a predetermined time period. More descriptions regarding the determination of the required storage bandwidth may be found elsewhere in the present disclosure (e.g., operation 520 and the description thereof). As another example, the determination unit 432 may determine the required computing bandwidth based on the data to be processed, which is similar to the determination of the required storage bandwidth.

The adjustment unit 433 may be configured to determination a distribution mode of a current computing bandwidth of one or more computing modules. For example, the adjustment unit 433 may determine whether the required storage bandwidth is larger than a current bandwidth of the one or more storage modules. The adjustment unit 433 may determine the distribution mode of the current computing bandwidth based on the result. More descriptions regarding the determination of the distribution mode of the current computing bandwidth can be found elsewhere in the present disclosure (e.g., operation 530 in FIG. 5 and FIG. 6 and the descriptions thereof).

The modules in the processing device 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof.

It should be noted that the above descriptions of the processing device are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. In some embodiments, two or more of the modules may be combined into a single module, and any one of the modules may be divided into two or more units. For example, the processing module 430 and the computing module 420 may be integrated into a single module. As another example, the obtaining unit 431 may include a sub-unit for obtaining the real-time data to be processed and a sub-unit for obtaining the cached data to be processed. As another example, the determination unit 432 may be divided into a plurality of sub-units each of which may implement a portion of functions of the determination unit 432. In some embodiments, the processing device 112 may include one or more additional modules. For example, the processing device 112 may include a communication module to send the analysis result of the data to be processed to one or more components (e.g., the terminal device 140) of the data processing system 100. As another example, the processing device 112 may include an analyzing unit to analyze the data to be processed according to the determined distribution mode of the current computing bandwidth.

Figure 5:
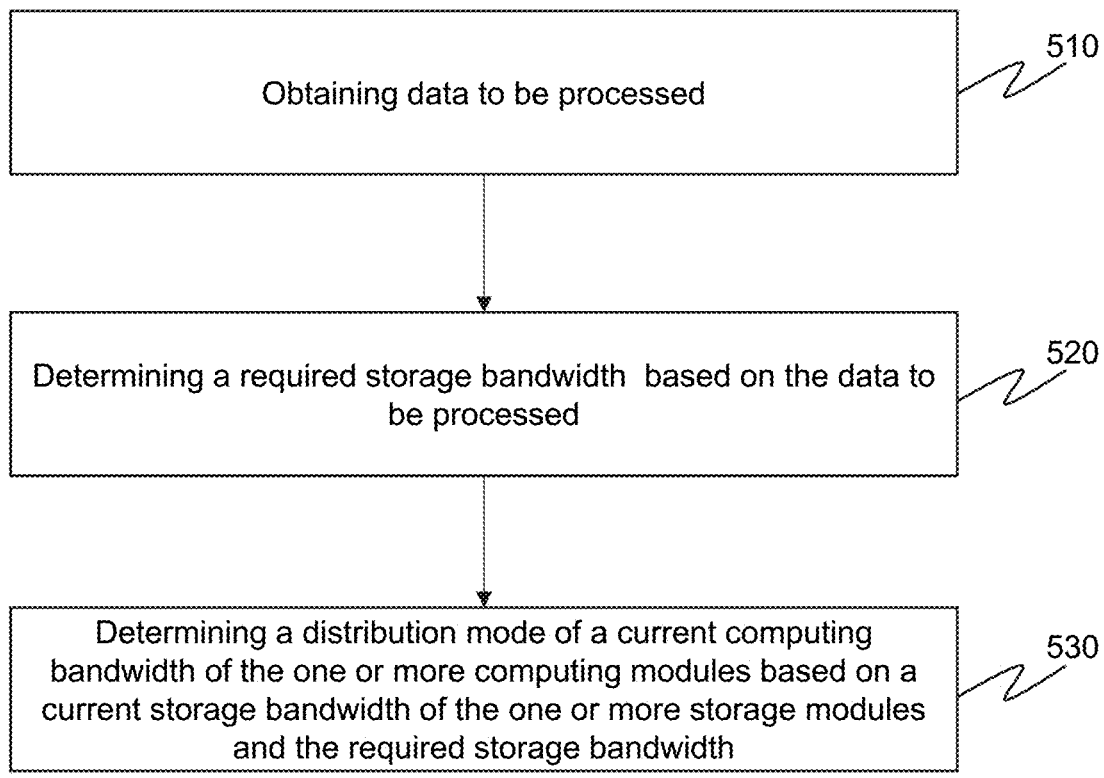
FIG. 5 is a flowchart illustrating an exemplary process for determining a distribution mode of a current computing bandwidth of computing modules according to some embodiments of the present disclosure.

FIG. 5 is a flowchart illustrating an exemplary process for determining a distribution mode of a current computing bandwidth of computing modules according to some embodiments of the present disclosure. In some embodiments, one or more operations in the process 500 may be implemented in the data processing system 100 illustrated in FIG. 1. For example, one or more operations in the process 500 may be stored in a storage device (e.g., the storage device 150, the ROM 230, the RAM 240, the storage 390, and/or the storage 304) as a form of instructions, and invoked and/or executed by a processing device (e.g., the processor 220, the CPU 340, the processor 302, and/or one or more modules of the processing device 112 illustrated FIG. 4) The operations of the illustrated process presented below are intended to be illustrative. In some embodiments, the process may be accomplished with one or more additional operations not described, and/or without one or more of the operations discussed. Additionally, the order in which the operations of the process 500 as illustrated in FIG. 5 and described below is not intended to be limiting.

In 510, the processing device 112 (e.g., the obtaining unit 431) may obtain data to be processed.

In some embodiments, the data to be processed may include image data or video data captured by the capture device 130. Take the traffic monitoring scenario as an example, the data to be processed may include real-time data (e.g., real-time video data) at a traffic intersection captured by the capture device 130. Since the traffic condition changes with time, the real-time data changes with time. For example, an amount of the data to be processed is relatively large at traffic peak periods, whereas the amount of the data to be processed is relatively small at traffic valley periods.

In some embodiments, the data to be processed may also include cached data (e.g., cached image data or cached video data) pre-cached in a storage device (e.g., the storage device 150, the one or more storage modules, the terminal device 140, an external storage device) associated with the data processing system 100.

In some embodiments, the data to be processed needs to be stored and/or analyzed. For example, the real-time data at a traffic intersection may need to be stored and at least a portion of the real-time data may need to be analyzed (e.g., traffic objects need to be extracted in the real-time video data). As another example, a portion of the real-time data may need to be stored and the other portion of the real-time data may need to be analyzed. As a further example, the cached data may need to be analyzed.

In 520, the processing device 112 (e.g., the determination unit 432) may determine a required storage bandwidth based on the data to be processed.

In some embodiments, the required storage bandwidth may include a first storage bandwidth that the data to be processed would occupy and/or a second storage bandwidth that an analysis result of the data to be processed would occupy. In some embodiments, the first storage bandwidth that the data to be processed would occupy may refer to a storage bandwidth that the real-time data would occupy (for the cached data, since it is already cached, no storage bandwidth is currently need).

In some embodiments, the processing device 112 may determine the required storage bandwidth based on at least one of a parameter associated with a capture device (e.g., the captured device 130) used to capture the data to be processed or historical data within a predetermined time period.

For example, for the real-time data to be stored, the first storage bandwidth that the real-time data would occupy may be associated with a parameter associated with a capture device used to capture the real-time data. The parameter associated with the capture device may be an intrinsic parameter (e.g., a video compression signal-to-noise ratio, a video coding resolution, a count of video channels) of the capture device. Accordingly, the first storage bandwidth that the real-time data would occupy would not change with manual settings.

As another example, for the real-time data to be analyzed or the cached data to be analyzed, the processing device 112 may estimate the second storage bandwidth that an analysis result of the real-time data or the cached data would occupy based on the historical data within the predetermined time period.

In some embodiments, the predetermined time period may be a recent time period (e.g., 1 minute, 2 minutes, 3 minutes, 5 minutes) adjacent to and before a current time point. In some embodiments, as described above, since the real-time data changes with time, the predetermined time period may be a historical time period including a historical time point corresponding to the current time point. For example, it is assumed that the current time point is 8:30 am, the predetermined time period may be a historical time period (e.g., 7:30 am-9:30 am, 7:00 am-10:00 am) including 8:30 am. In some embodiments, a time length of the predetermined time period may be a default setting of the data processing system 100 or may be adjustable according to different situations.

The processing device 112 may determine multiple historical storage bandwidths that historical analysis results occupied during the predetermined time period. In some embodiments, the processing device 112 may designate a maximum one (or a weighted value or an average value) of the multiple historical storage bandwidths as the second required storage bandwidth. In some embodiments, the processing device 112 may determine the second required storage bandwidth based on the multiple historical bandwidths according to an artificial intelligence technology, a machine learning model, a statistical analysis, etc.

In some embodiments, the processing device 112 may determine the required storage bandwidth based on an amount of the data to be processed, a data parameter (e.g., a definition, a contrast, a resolution, etc. of the image data or the video data) of the data to be processed, etc.

In 530, the processing device 112 (e.g., the determination unit 432 or the adjustment unit 433) may determine a distribution mode of a current computing bandwidth of one or more computing modules (e.g., the computing module 420) based on a current storage bandwidth of one or more storage modules (e.g., the storage module 410) and the required storage bandwidth.

In some embodiments, the current computing bandwidth of the one or more computing modules refers to a currently available computing bandwidth of the one or more computing modules; similarly, the current storage bandwidth of the one or more storage modules refers to a currently available storage bandwidth of the one or more storage modules.

In some embodiments, the processing device 112 may determine whether the required storage bandwidth is larger than the current storage bandwidth. The processing device 112 may determine the distribution mode of the current computing bandwidth based on the determination result. Merely by way of example, it is assumed that the required storage bandwidth is larger than the current storage bandwidth, that is, the current storage bandwidth can't meet the storage requirements, the processing device 112 may allocate a portion of the current computing bandwidth to be used to compress the data to be processed. More descriptions regarding the distribution mode of the current computing bandwidth of the one or more computing modules can be found elsewhere in the present disclosure (e.g., FIG. 6 and the description thereof).

In some embodiments, the processing device 112 may predict a future data condition and determine a distribution mode of the current computing bandwidth in advance. For example, the processing device 112 may predict (e.g., based on historical data, using a machine learning model) a required storage bandwidth at a future time point or within a future time period and determine a distribution strategy of the current computing bandwidth in advance, for example, a portion is allocated for compression, the other portion is used for computing, etc.

According to some embodiments of the present disclosure, the required computing bandwidth associated with the data to be processed is estimated, and the required storage bandwidth and the current storage bandwidth are compared to determine a distribution mode of a current computing bandwidth, such that the computing service and the storage service can be performed cooperatively, thereby improving storage performance and computing efficiency.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 500, and/or one or more operations of the process 500 described above may be omitted. For example, an additional operation may be added before operation 520 for determining whether a current storage capacity (e.g., an available storage space)

of the one or more storage modules is larger than a preset storage capacity. In response to a determination that the current storage capacity is larger than the preset storage capacity, the process 500 may proceed to operation 520. In response to a determination that the current storage capacity is less than or equal to the present storage capacity, the processing device 112 may delete a portion of the data stored in the one or more storage modules to release some storage space of the one or more storage modules.

Figure 6:
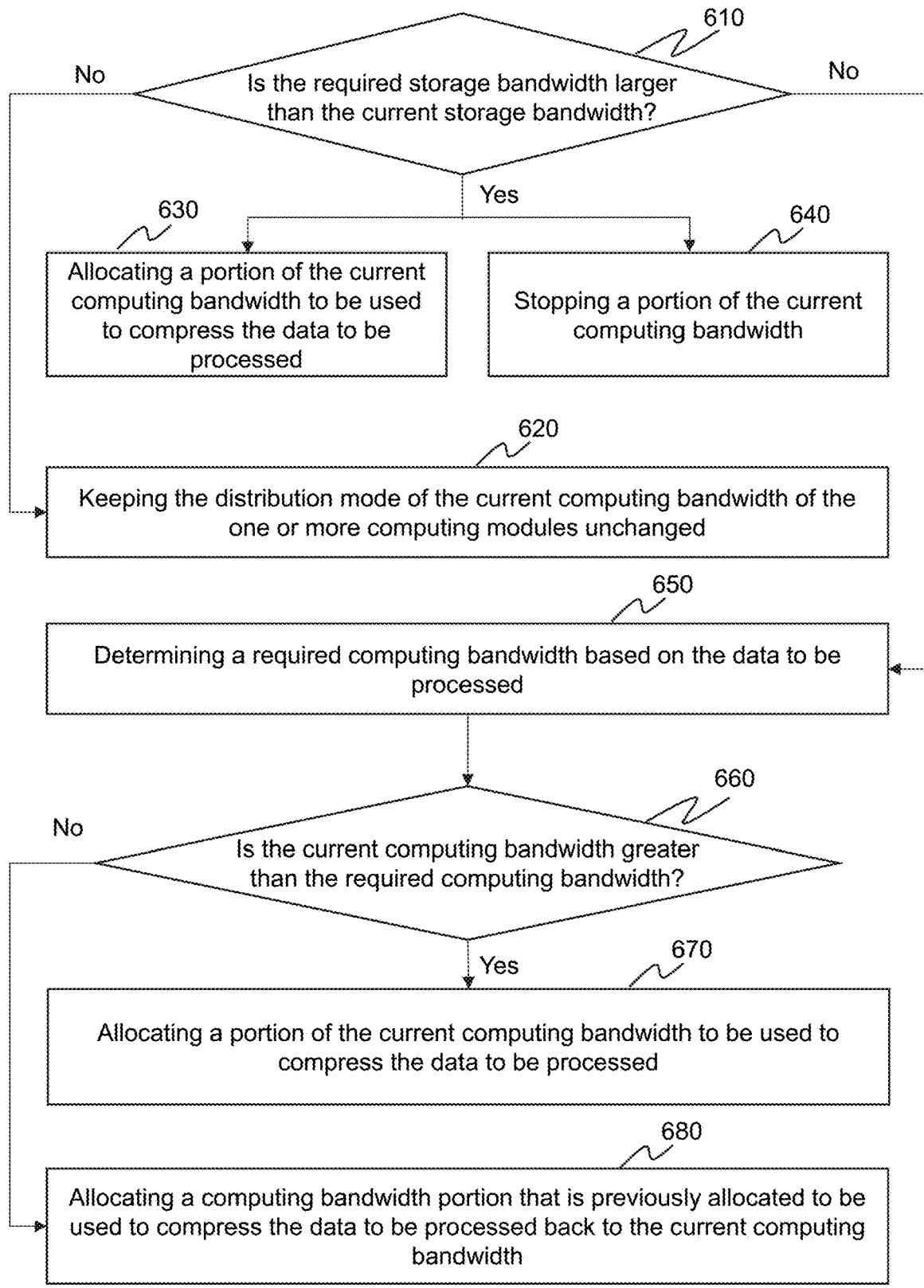
FIG. 6 is a flowchart illustrating an exemplary process for determining a distribution mode of a current computing bandwidth of computing modules according to some embodiments of the present disclosure.

FIG. 6 is a flowchart illustrating an exemplary process for determining a distribution mode of a current computing bandwidth according to some embodiments of the present disclosure. In some embodiments, one or more operations in the process 600 may be implemented in the data processing system 100 illustrated in FIG. 1. For example, one or more operations in the process 600 may be stored in a storage device (e.g., the storage device 150, the ROM 230, the RAM 240, the storage 390, and/or the storage 304) as a form of instructions, and invoked and/or executed by a processing device (e.g., the processor 220, the CPU 340, the processor 302, and/or one or more modules illustrated FIG. 4). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, operation 530 in FIG. 5 may be achieved by the process 600.

In 610, the processing device 112 (e.g., the adjustment unit 433) may determine whether the required storage bandwidth is larger than the current storage bandwidth.

In response to a determination that the required storage bandwidth is less than or equal to the current storage bandwidth, in 620, the processing device 112 (e.g., the adjustment unit 433) may keep the distribution mode of the current computing bandwidth of the one or more computing modules unchanged. That is, when the current storage bandwidth can meet storage requirements, there is no need to adjust the distribution mode of the current computing bandwidth of the one or more computing modules.

In some embodiments, in response to a determination that the required storage bandwidth is larger than the current storage bandwidth, in 630, the processing device 112 (e.g., the adjustment unit 433) may allocate a portion of the current computing bandwidth to be used to compress the data to be processed. That is, when the current storage bandwidth can't meet storage requirements, the processing device 112 may allocate a portion of the current computing bandwidth for compression to improve storage function.

In some embodiments, the portion of the current computing bandwidth allocated to be used to compress the data to be processed may be determined based on the required storage bandwidth and the current storage bandwidth, for example, a different between the required storage bandwidth and the current storage bandwidth. For example, it is assumed that the required storage bandwidth is 120 MB/s (e.g., the first storage bandwidth is 80 MB/s and the second storage bandwidth is 40 MB/s) and the current storage bandwidth is 100 MB/s, the processing device 112 may allocate a portion (e.g., 10 MB/s) of the current computing bandwidth to be used to compress the data to be processed to improve storage function, accordingly, an updated required storage bandwidth becomes 100 MB/s (e.g., the first storage bandwidth becomes 70 MB/s and the second storage bandwidth is reduced to 30 MB/s (since 10 MB/s of the current computing bandwidth is allocated for compression, corresponding computing is stopped)). In this situation, the original data to be processed can be completely stored and an analysis result of the data can be stored as much as possible.

In some embodiments, in response to a determination that the required storage bandwidth is larger than the current storage bandwidth, in 640, the processing device 112 (e.g., the adjustment unit 433) may stop a portion of the current computing bandwidth, such that an updated required storage bandwidth is no larger than the current storage bandwidth.

For example, as described above, it is assumed that the required storage bandwidth is 120 MB/s (e.g., the first storage bandwidth is 80 MB/s and the second storage bandwidth is 40 MB/s) and the current storage bandwidth is 100 MB/s, the processing device 112 may stop a portion (e.g., 20 MB/s) of the current computing bandwidth, accordingly, an updated required storage bandwidth becomes 100 MB/s (e.g., the first storage bandwidth is still 80 MB/s and the second storage bandwidth is reduced to 20 MB/s (since 20 MB/s of the current computing bandwidth is stopped)) which is equal to the current storage bandwidth.

In some embodiments, in response to a determination that the required storage bandwidth is less than or equal to the current storage bandwidth, in 650, the processing device 112 (e.g., the determination unit 432) may determine a required computing bandwidth based on the data to be processed.

As described in connection with operation 510 and operation 520, the required computing bandwidth refers to a computing bandwidth that the portion of the real-time data to be analyzed would occupy or a computing bandwidth that the cached data to be analyzed would occupy. In some embodiments, the processing device 112 may determine the required computing bandwidth based on historical data within a predetermined time period, which is similar to the determination of the required storage bandwidth as described in 520 and is not repeated here.

In 660, the processing device 112 (e.g., the adjustment unit 433) may determine whether the current computing bandwidth is greater than the required computing bandwidth.

In response to a determination that the current computing bandwidth is greater than the required computing bandwidth, in 670, the processing device 112 (e.g., the adjustment unit 433) may allocate a portion of the current computing bandwidth to be used to compress the data to be processed. That is, when the current computing bandwidth can meet computing requirements, the processing device 112 can allocate a portion of the current computing bandwidth for compression, which can improve the resource utilization.

In response to a determination that the current computing bandwidth is less than or equal to the required computing bandwidth, in 680, the processing device 112 (e.g., the adjustment unit 433) may allocate a computing bandwidth that is previously allocated to be used to compress the data to be processed back to the current computing bandwidth. That is, when the current computing bandwidth can't meet computing requirements, the processing device 112 may allocate at least a part of a computing bandwidth that is previously allocated for compression back for computing.

In some embodiments, the processing device 112 may comprehensively consider the required computing bandwidth and the required storage bandwidth to allocate the computing bandwidth portion that is previously allocated for compression back for computing.

In some embodiments, the processing device 112 may first ensure the storage requirements and allocate the remaining storage bandwidth (which is previously allocated from the computing bandwidth) back for computing. For example, it is assumed that the required storage bandwidth is 90 MB/s (e.g., the first storage bandwidth is 40 MB/s and the second storage bandwidth is 50 MB/s) and the current storage bandwidth is 100 MB/s (including remaining storage bandwidth 10 MB/s previously allocated from the computing bandwidth), while the required computing bandwidth is 40 MB/s and the current computing bandwidth to be used is 20 MB/s, the processing device 112 may allocate a computing bandwidth that is previously allocated to be used to compress the data to be processed (i.e., the remaining storage bandwidth 10 MB/s) back to the current computing bandwidth. Accordingly, an updated current computing bandwidth becomes 30 MB/s. In this situation, the original data to be processed can be completely stored and an analysis result of the data can be stored as much as possible.

In some embodiments, it is assumed that the required computing bandwidth includes a computing bandwidth that the portion of the real-time data to be analyzed would occupy and a computing bandwidth that the cached data to be analyzed would occupy, the processing device 112 may prioritize the computing (or analyzing) of the real-time data, that is, the priority of the computing of the real-time is higher than that of the cached data. For example, it is assumed that the required storage bandwidth is 120 MB/s (e.g., the first storage bandwidth is 40 MB/s and the second storage bandwidth is 80 MB/s that includes a storage bandwidth 60 MB/s occupied by the real-time data to be analyzed and a storage bandwidth 20 MB/s occupied by the cached data to be analyzed) and the current storage bandwidth is 100 MB/s, while the required computing bandwidth is 80 MB/s (e.g., a computing bandwidth 60 MB/s required by the real-time data to be analyzed, and 20 MB/s required by the cached data to be analyzed) and the current computing bandwidth to be used is 60 MB/s, the processing device 112 may allocate the current computing bandwidth (i.e., 60 MB/s) to be used to analyze the real-time data to be analyzed. In this situation, the original data to be processed can be completely stored and an analysis result of the real-time data to be analyzed can be stored as much as possible.

In some embodiments, there may be different user needs or priorities under different situations. For example, for the real-time data (e.g., real-time video data), a priority for storing the data itself may be higher than a priority for storing an analysis result of the data. As another example, for the real-time data and the cached data, a priority for storing an analysis result of the real-time data may be higher than a priority for storing an analysis result of the cached data. As a further example, for the real-time data and the cached data, a priority for analyzing the real-time data may be higher than a priority for analyzing the cached data. As still a further example, a user may wish to store data in a definition as high as possible; whereas, another user may wish to store data as much as possible. Accordingly, there may be different strategies applicable for different situations for determining the distribution mode of the current computing bandwidth.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more additional operations may be added in the process 600, and/or one or more operations of the process 600 described above may be omitted.

Figure 7:
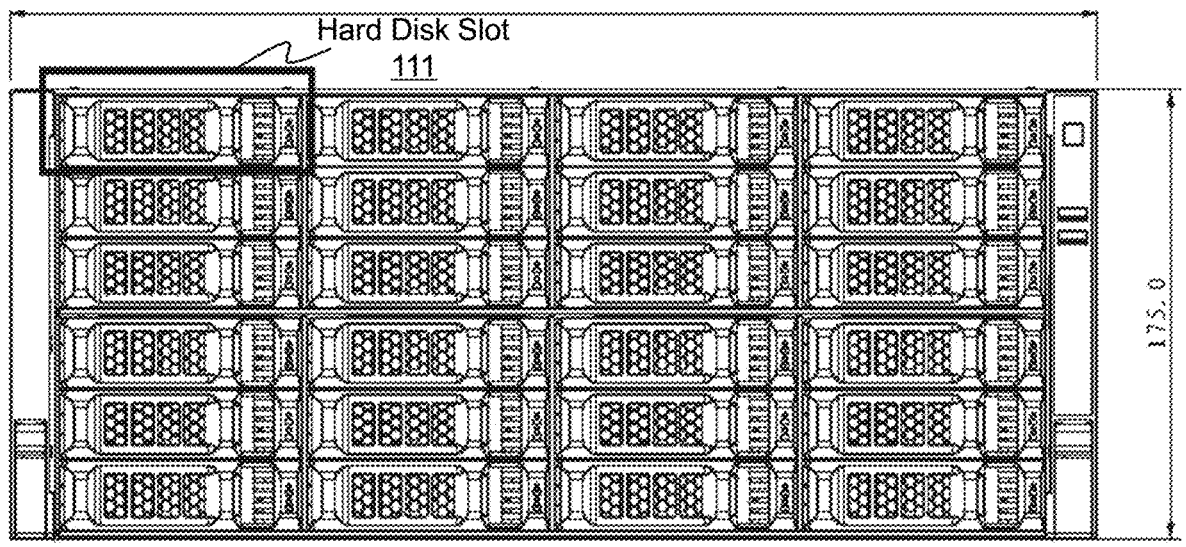
FIG. 7 is a schematic diagram illustrating an exemplary structure of a processing device or a processing module thereof according to some embodiments of the present disclosure.

FIG. 7 is a schematic diagram illustrating an exemplary structure of a processing device or a processing module thereof according to some embodiments of the present disclosure. As illustrated in FIG. 7, the processing device 112 or the processing module 430 may include one or more hard disk slots 111 into which an integrated storage-computing device or storage module(s) (e.g., the storage module 410) and/or computing module(s) (e.g., the storage module 420) can be inserted through interface(s).

Figure 8:
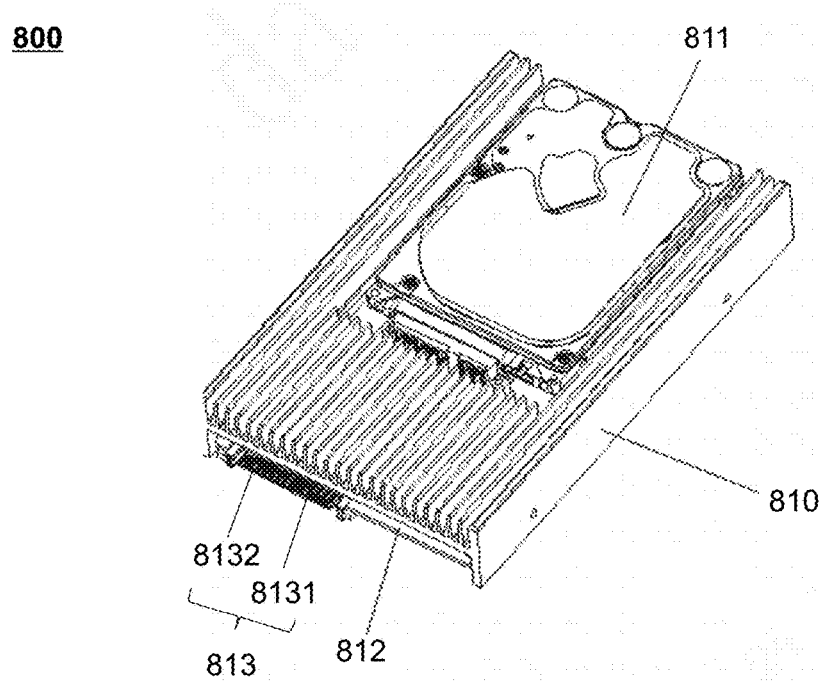
FIG. 8 is a schematic diagram illustrating an exemplary structure of an integrated storage-computing device according to some embodiments of the present disclosure.

FIG. 8 is a schematic diagram illustrating an exemplary structure of an integrated storage-computing device according to some embodiments of the present disclosure. The integrated storage-computing device may be configured to provide both storage and computing functions. As described elsewhere in the present disclosure, the integrated storage-computing device may include one or more storage modules and one or more computing modules.

As shown in FIG. 8, a type of the integrated storage-computing device 800 may be a hard disk type, which is provided for illustration purposes and not intended to be limiting. The integrated storage-computing device 800 may include a device box 810, a storage module (e.g., a storage disk 811), and a computing module (e.g., a computing card 812. The storage disk 811 and the computing card 812 may be disposed in the device box 810. The device box 810 may be set to be closed, such that the storage disk 811 and the computing card 812 can be protected from damage.

In some embodiments, the integrated storage-computing device 800 may include a device interface 813 disposed on an end of the device box 810. The device interface 810 may be configured for data communication. For example, the device interface 813 may include a first interface channel 8131 and a second interface channel 8132 which are arranged in parallel. The first interface channel 8131 may include one or more serial advanced technology attachment (SATA) cables or serial attached small computer system interface (SAS) cables. The first interface channel 8131 may be connected to the storage disk 811 by the SATA cable(s) or SAS cable(s). The second interface channel 8132 may include one or more peripheral component interconnect express (PCIE) cables or network cables. The second interface channel 8132 may be connected to the computing card 812 by the PCIE cable(s) or network cable(s).

As described in connection with FIG. 7, the integrated storage-computing device 800 can be connected to the processing device 112 or the processing module 430 by inserting the device interface 813 into the hard disk slot 111.

Figure 9A:
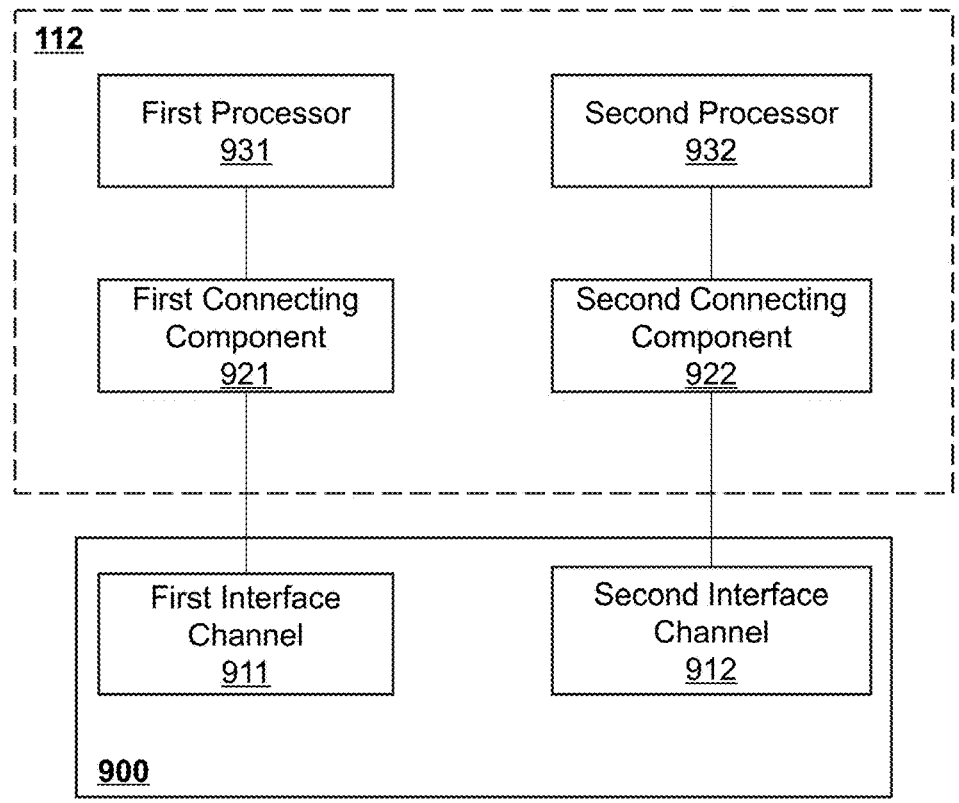
FIGS. 9A-9C are schematic diagrams illustrating an exemplary connection between a processing device or a processing module thereof and an integrated storage-computing device according to some embodiments of the present disclosure.
Figure 9B:
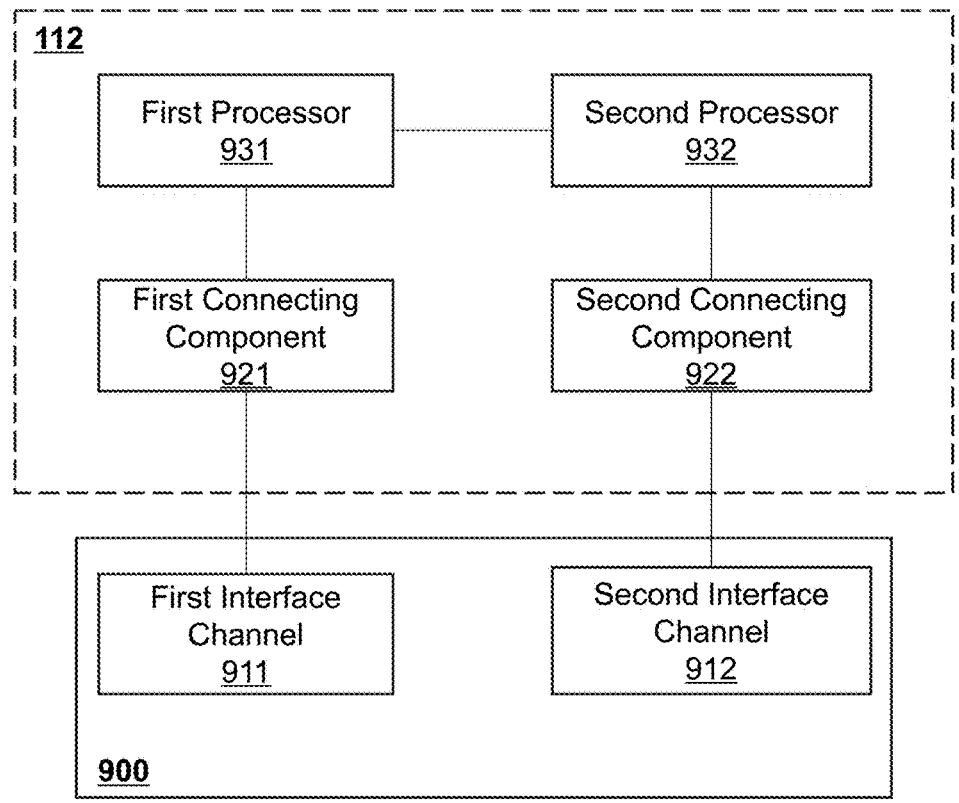
Figure 9C:
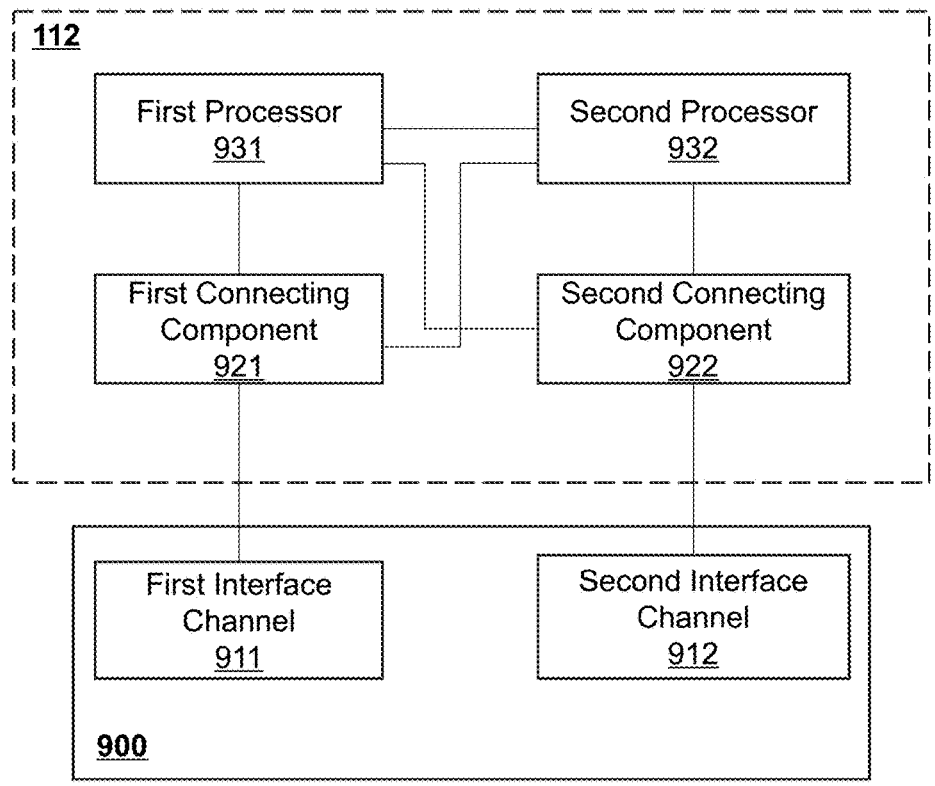

FIGS. 9A-9C are schematic diagrams illustrating an exemplary connection between a processing device or a processing module thereof and an integrated storage-computing device according to some embodiments of the present disclosure.

As shown in FIGS. 9A-9C, the integrated storage-computing device 900 may include one or more storage modules (not shown), one or more computing modules (not shown), a first interface channel 911, and a second interface channel 912. The processing device 112 (or the processing module 430) may include a first processor (or controller) 931, a first connecting component (e.g., a first expansion module) 921, a second processor (or controller) 932, and a second connecting component (e.g., a second expansion module) 922.

As illustrated, the first interface channel 911 is connected to the first connecting component 921 and the second interface channel 912 is connected to the second connecting component. As described in connection with FIG. 8, the first interface channel 911 may include one or more serial advanced technology attachment (SATA) cables or serial attached small computer system interface (SAS) cables; the second interface channel 912 may include one or more peripheral component interconnect express (PCIE) cables or network cables. Accordingly, the first connecting component 921 may include a SAS expansion module, a SATA expansion module, etc. The second connecting component 922 may include a PCIE expansion module.

In some embodiments, the SATA expansion module has a super error correction ability of automatically correcting data reading error(s) during data reading, which greatly improves the reliability of data transmission. The SAS expansion module integrates the advantages of the existing parallel SCSI and serial connection technology and takes serial communication as a protocol infrastructure, uses a SCSI-3 expansion instruction set, and is compatible with a SATA device. The SAS expansion module may be a multi-level storage device connection protocol stack. The SAS expansion module may have a high data transfer rate.

In some embodiments, the PCIE expansion module may use a point-to-point interconnection technology to allocate a shared channel bandwidth for each device, which ensures bandwidth resources of multiple devices and greatly improves data transmission rate. In addition, the PCIE expansion module may adopt a two-channel transmission mode similar to full-duplex communication technology. In terms of speed, the PCIE expansion module may provide a transfer rate of 2.5 gigabytes/second (GB/s) per channel.

As illustrated in FIG. 9A, the storage module(s) of the integrated storage-computing device 900 may be connected to the first interface channel 911; the computing module(s) of the integrated storage-computing device 900 may be connected to the second interface channel 912. The first interface channel 911 may be connected to the first connecting component 921 and the second interface channel 912 may be connected to the second connecting component 922. The first connecting component 921 may be connected to the first processor 931 and the second connecting component 922 may be connected to the second processor 932. Accordingly, the storage module(s) of the integrated storage-computing device 900 can be connected to the first processor 931 via the first interface channel 911 and the first connecting component 921; the computing module(s) of the integrated storage-computing device 900 can be connected to the second processor 932 via the second interface channel 912 and the second connecting component 922.

As illustrated in FIG. 9B, the connecting manner between the processing device 112 (or the processing module 430) and the integrated storage-computing device 900 is similar with that illustrated in FIG. 9A, a difference is that the first processor 931 may be connected to the second processor 932. For example, the first processor 931 may be connected to the second processor 932 via a network (e.g., an ethernet, an optical fiber) or a PCIE bus. Accordingly, the first processor 931 may send data to be stored to the second processor 932 for storage; the second processor 932 may send data to be analyzed to the first processor 931 for computing. For example, the first processor 931 may obtain an analysis result from the computing module(s) of the integrated storage-computing device 900 and send the analysis result to the second processor 932. The second processor 932 may send the analysis result to the storage module(s) of the integrated storage-computing device 900 for storage. As another example, the second processor 932 may obtain data to be analyzed from the storage module(s) of the integrated storage-computing device 900 and send the data to be analyzed to the first processor 931. The first processor 931 may send the data to be analyzed to the computing module(s) of the integrated storage-computing device 900 for computing. As still another example, the second processor 932 may obtain the storage resource (e.g., the data stored in the storage module(s)) of the integrated storage-computing device 900 and send the storage resource to the first processor 931. The first processor 931 may obtain the computing resource of the integrated storage-computing device 900 for processing the storage resource and send the processed data to the second processor 932. Then the second processor 932 may send the processed data to the integrated storage-computing device 900.

Accordingly, the first processor 931 and the second processor 932 can share the storage resource and the computing resource of the integrated storage-computing device 900, thereby improving the processing efficiency of the processing device 112 or the processing module 430.

In some embodiments, to ensure data reliability, the processing device 112 or the processing module 430 may be configured with a double-control function. That is, a processor of the processing device 112 or the processing module 430 can control both the storage module(s) and the computing module(s) of the integrated storage-computing device 900. As shown in FIG. 9C, the first connecting component 921 may be connected to the second processor 932 the second connecting component 922 may be connected to the first processor 931. Accordingly, when the second processor 932 is in an abnormal state, the first processor 931 can take over the second connecting component 922 and obtain the storage resource from the integrated storage-computing device 900 via the second connecting component 922 for performing storage function. When the first processor 932 is in an abnormal state, the second processor 932 can take over the first connecting component 921 and obtain the computing resource from the integrated storage-computing device 900 via the first connecting component 921 for performing the computing function.

In some embodiments, the first processor 931 may send a first heartbeat message to the second processor 932. If the first processor 931 does not receive a response of the first heartbeat message from the second processor 932 in a first preset time period, the second processor 932 may be determined to be in an abnormal state. If the first processor 931 receives a response of the first heartbeat message from the second processor 932 in the first preset time period, the second processor 932 may be determined to be in a normal state. Alternatively, the second processor 932 may send a second heartbeat message to the first processor 931. If the second processor 932 does not receive a response of the second heartbeat message from the first processor 931 in a second preset time period, the first processor 931 may be determined to be in an abnormal state. If the second processor 932 receives a response of the second heartbeat message from the first processor 931 in the second preset time period, the first processor 931 may be determined to be in a normal state. The first preset time period or the second preset time period may be a default setting of the data processing system 100 or adjustable according to different scenarios.

In some embodiments, when the first processor 931 and the second processor 932 are both in a normal state, the first processor 931 may exclusively access the computing resource of the integrated storage-computing device 900; the second processor 932 may exclusively access the storage resource of the integrated storage-computing device 900. When the first processor 931 detects that the second processor 932 is in an abnormal state, the first processor 931 may access the storage resource of the integrated storage-computing device 900 and obtain the storage resource or the computing resource of the integrated storage-computing device 900 for performing the storage function or the computing function. Similarly, when the second processor 932 detects that the first processor 931 is in an abnormal state, the second processor 932 may access the computing resource of the integrated storage-computing device 900 and obtain the storage resource or the computing resource of the integrated storage-computing device 900 for performing the storage function or the computing function.

In some embodiments, the first processor 931 or the second processor 932 may recover from the abnormal state to the normal state at any time. In such cases, in order to improve processing efficiency of the processing device 112 or the processing module 430, the recovered processor may recover to access its corresponding resource from the integrated storage-computing device 900 for performing its corresponding function. For example, when the second processor 932 recovers to the normal state, the connection between the first processor 931 and the second connecting component 922 may be disconnected, the second processor 932 may be connected to the second connecting component 922 and obtain the storage resource of the integrated storage-computing device 900 via the second connecting component 922 for performing the storage function. As another example, when the first processor 931 recovers to the normal state, the connection between the second processor 932 and the first connecting component 921 may be disconnected, the first processor 931 may be connected to the first connecting component 921 and obtain the computing resource of the integrated storage-computing device 900 via the first connecting component 921 for performing the computing function.

Figure 10:
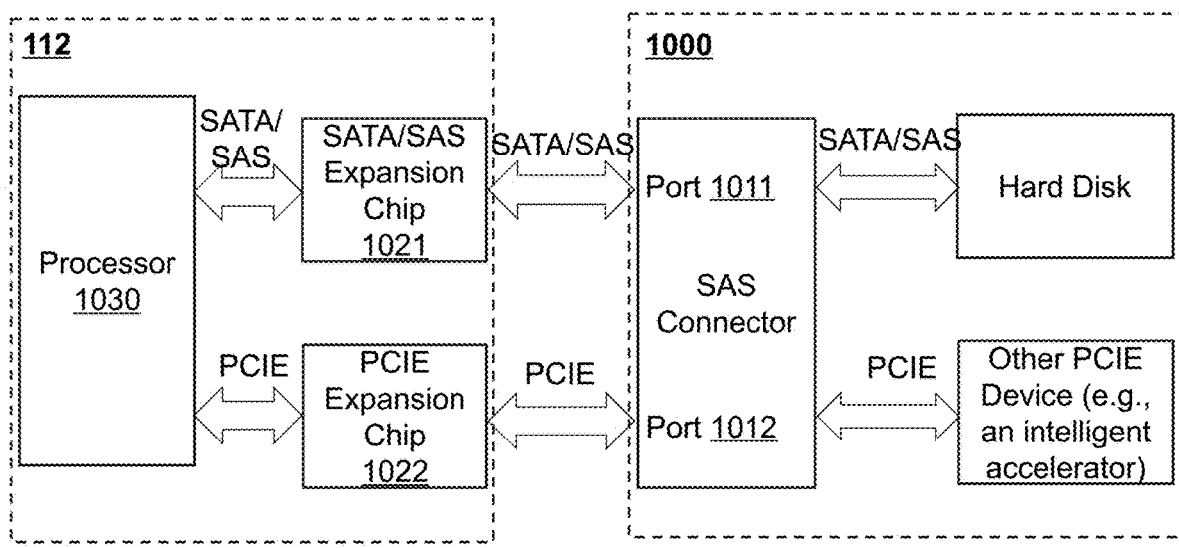
FIG. 10 is a schematic diagram illustrating an exemplary connection between a processing device or a processing module thereof and an integrated storage-computing device according to some embodiments of the present disclosure.

FIG. 10 is a schematic diagram illustrating an exemplary connection between a processing device or a processing module thereof and an integrated storage-computing device according to some embodiments of the present disclosure. As shown in FIG. 10, the processing device 112 or the processing module 430 may include a processor 1030, a first connecting component (e.g., a SATA/SAS expansion chip) 1021, and a second connecting component (e.g., a PCIE expansion chip) 1022. The integrated storage-computing device 1000 may include a storage module (e.g., a hard disk), a computing module (e.g., other PCIE device(s) such as an intelligent accelerator), and a SAS connector (including a first port 1011 and a second port 1012). As described in connection with FIG. 8 or FIG. 9, the first port 1011 and the second port 1012 may be similar to the first interface channel 8131 (or 911) and the second interface channel 8132 (or 912), respectively.

The SATA/SAS expansion chip 1021 may be connected to the processor 1030 via a SATA/SAS connection and connected to the port 1011 via a SATA/SAS connection. The port 1011 may be connected to the storage module of the integrated storage-computing device 800 via a SATA/SAS connection. The PCIE expansion chip 1022 may be connected to the processor 1030 via a PCIE connection and connected to the port 1012 via a PCIE connection. The port 1012 may be connected to the computing module of the integrated storage-computing device 1000 via a PCIE connection. Accordingly, the processor 1030 may obtain the storage resource of the integrated storage-computing device 1000 via the SATA/SAS expansion chip 1021; the processor 1030 may obtain the computing resource of the integrated storage-computing device 1000 via the PCIE expansion chip 1022. In this way, the processing device 112 or the processing module 430 can perform the storage function and the computing function simultaneously.

FIG. 11 is a flowchart of an exemplary process for data storage according to some embodiments of the present disclosure. In some embodiments, one or more operations in the process 1100 may be implemented in the data processing system 100 (e.g., the server 110 (e.g., the processing device 112) of the data processing system 100) illustrated in FIG. 1. For example, one or more operations in the process 1100 may be stored in a storage device (e.g., the storage device 150, the ROM 230, the RAM 240, the storage 390, and/or the storage 304) as a form of instructions, and invoked and/or executed by a processing device (e.g., the processor 220, the CPU 340, and/or one or more modules of the processing device 112 illustrated FIG. 4) The operations of the illustrated process presented below are intended to be illustrative. In some embodiments, the process may be accomplished with one or more additional operations not described, and/or without one or more of the operations discussed. Additionally, the order in which the operations of the process 1100 as illustrated in FIG. 11 and described below is not intended to be limiting.

In 1110, the processing device 112 may determine a current storage bandwidth of N storage module(s) and a current computing bandwidth of M computing module(s) based on data to be processed. The N storage module(s) may be configured to store the data to be processed. The M computing module(s) may be configured to process (e.g., compress and/or analyze) the data to be processed. Both N and M may be natural numbers that are greater than or equal to 1. The N storage module(s) and the M computing module(s) may be disposed in a same device (e.g., the integrated storage-computing device 800).

In 1120, the processing device 112 may adjust a count of the M computing module(s) based on the current storage bandwidth and the current computing bandwidth, such that K computing module(s) of the M computing module(s) may be used to process the data to be processed to obtain target data. K may be a natural number that is less than or equal to M.

In 1130, the processing device 112 may store the target data in the N storage module(s).

In some embodiments, the operations of the process 1100 may be implemented by a terminal device (e.g., a capture device), or the like.

In some embodiments, a computing module herein may include but not limited to a smart card disposed in the terminal device. A storage module may include but not limited to a storage hard disk disposed in the terminal device. For example, there may be 5 storage hard disks and 10 smart cards that are disposed in the terminal device. As shown in FIG. 7, a storage hard disk or a smart card of a hard disk type may be connected to the hard disk slot 111. The storage hard disk and the smart card may be interchangeable and compatible. The hard disk may exist as a storage pool, and the smart card may exist as a smart pool.

In some embodiments, the data to be processed may include but not limited to video data acquired by a capture device, for example, image data of vehicles acquired in a violation monitoring scenario. In this scenario, there may be a large amount of image data of vehicles, and a portion of the computing module(s) may be used to assist the storage module for storage. For example, the portion of the computing module(s) may be used to compress the acquired image data, and then store the compressed image data in the storage module(s). That is, the memory of the storage module(s) may be reduced, thereby extending the storage cycle of the storage module(s).

According to the above operations of the process 1100, the storage service and the computing service may be performed simultaneously and cooperatively, thereby achieving the effect of improving the storage performance.

In some embodiments, the determining a current storage bandwidth of N storage module(s) and a current computing bandwidth of M computing module(s) based on data to be processed may include:

S1, determining a required storage bandwidth of the data to be processed;

S2, determining a current storage bandwidth of the N storage module(s);

S3, determining a property (or attribute) of the data to be processed (e.g., a type of the data to be processed such as real-time videos or cached images);

S4, determine the current computing bandwidth of the M computing module(s) based on the property of the data to be processed.

In some embodiments, the adjusting a count of the M computing module(s) based on the current storage bandwidth and the current computing bandwidth, such that K computing module(s) of the M computing module(s) is used to process the data to be processed to obtain target data may include:

S5, in response to a determination that the current storage bandwidth does not satisfy the required storage bandwidth of the data to be processed, and the computing bandwidth of the M computing module(s) is greater than a required computing bandwidth of the data to be processed, designating computing module(s) corresponding to the K analysis channels as device(s) for processing the data to be processed to obtain the target data.

In some embodiments, the processing device 112 (e.g., a CPU) may determine the required computing bandwidth of the data to be processed. If the current computing bandwidth is excess (e.g., the current computing bandwidth being larger than the required computing bandwidth), excess computing module(s) may be configured to perform intelligent compression, improving the storage performance of the storage module(s).

In some embodiments, the analyzing the data to be processed by the K analysis channels to obtain the target data may include:

S6, determining computing module(s) corresponding to the K analysis channels as the device(s) for processing the data to be processed, and using the computing module(s) to compress the data to be processed to obtain the target data.

In some embodiments, the computing module(s) corresponding to the K analysis channels may be used to assist the storage module(s) for data storage to improve the storage performance of the storage module(s).

In some embodiments, the storing the target data in the N storage module(s) may include:

S7, storing the target data in the N storage module(s) in accordance with a preset cycle (e.g., a preset storage cycle).

In some embodiments, the storing of the target data by the storage module may be within the preset cycle, for example, storing video data within one-week.

It should be noted that the description of stages of data storage is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
   one or more storage modules;
   one or more computing modules, wherein the one or more computing modules are configured to process data to be processed;
   at least one storage device including a set of instructions; and
   at least one processor in communication with the at least one storage device, wherein the at least one processor includes a first processor and a second processor in communication with each other;
   the one or more storage modules are connected to the first processor and the second processor respectively via a first connecting component; and
   the one or more computing modules are connected to the first processor and
   the second processor respectively via a second connecting component; wherein when executing the set of instructions, the at least one processor is directed to cause the system to perform operations including:
   obtaining the data to be processed;
   determining a required storage bandwidth based on the data to be processed; and
   determining a distribution mode of a current computing bandwidth of the one or more computing modules based on a current storage bandwidth of the one or more storage modules and the required storage bandwidth, wherein the current computing bandwidth of the one or more computing modules refers to a currently available computing bandwidth of the one or more computing modules.

2. The system of claim 1, wherein the required storage bandwidth includes at least one of:
   a first storage bandwidth that the data would occupy, or
   a second storage bandwidth that an analysis result of the data would occupy.

3. The system of claim 1, wherein the determining a required storage bandwidth based on the data to be processed includes:
   determining the required storage bandwidth based on at least one of a parameter associated with a capture device used to capture the data to be processed or historical data within a predetermined time period.

4. The system of claim 1, wherein the determining a distribution mode of a current computing bandwidth of the one or more computing modules based on a current storage bandwidth of the one or more storage modules and the required storage bandwidth includes:
   determining whether the required storage bandwidth is larger than the current storage bandwidth; and
   determining the distribution mode of the current computing bandwidth based on the determination result.

5. The system of claim 4, wherein the determining the distribution mode of the current computing bandwidth based on the determination result includes:
   in response to a determination that the required storage bandwidth is less than or equal to the current storage bandwidth, keeping the distribution mode of the current computing bandwidth of the one or more computing modules unchanged.

6. The system of claim 4, wherein the determining the distribution mode of the current computing bandwidth based on the determination result includes:
   in response to a determination that the required storage bandwidth is larger than the current storage bandwidth, allocating a portion of the current computing bandwidth to be used to compress the data to be processed.

7. The system of claim 4, wherein the determining the distribution mode of the current computing bandwidth based on the determination result includes:
   in response to a determination that the required storage bandwidth is larger than the current storage bandwidth, stopping a portion of the current computing bandwidth, such that an updated required storage bandwidth is no larger than the current storage bandwidth.

8. The system of claim 4, wherein the determining the distribution mode of the current computing bandwidth based on the determination result includes:
   in response to determining that the required storage bandwidth is less than or equal to the current storage bandwidth,
      determining a required computing bandwidth based on the data to be processed;
      determining whether the current computing bandwidth is greater than the required computing bandwidth; and
      in response to a determination that the current computing bandwidth is greater than the required computing bandwidth, allocating a portion of the current computing bandwidth to be used to compress the data to be processed.

9. The system of claim 4, wherein the determining the distribution mode of the current computing bandwidth based on the determination result includes:
   in response to determining that the required storage bandwidth is less than or equal to the current storage bandwidth,
      determining a required computing bandwidth based on the data to be processed;
      determining whether the current computing bandwidth is greater than the required computing bandwidth; and
      in response to a determination that the current computing bandwidth is less than the required computing bandwidth, allocating a computing bandwidth that is previously allocated to be used to compress the data to be processed back to the current computing bandwidth.

10. The system of claim 1, wherein the data to be processed includes real-time video data.

11. The system of claim 1, wherein the one or more storage modules and the one or more computing modules are integrated into an integrated storage-computing device.

12. A method implemented on a computing device including at least one processor, one or more storage modules, and one or more computing modules, wherein the at least one processor includes a first processor and a second processor in communication with each other;
   the one or more storage modules are connected to the first processor and the second processor respectively via a first connecting component; and
the one or more computing modules are connected to the first processor and the second processor respectively via a second connecting component, the method comprising:
   obtaining data to be processed;
   determining a required storage bandwidth based on the data to be processed; and
   determining a distribution mode of a current computing bandwidth of one or more computing modules based on a current storage bandwidth of one or more storage modules and the required storage bandwidth, wherein the one or more computing modules are configured to process the data to be processed, and
   the current computing bandwidth of the one or more computing modules refers to a currently available computing bandwidth of the one or more computing modules.

13. The method of claim 12, wherein the required storage bandwidth includes at least one of:
   a first storage bandwidth that the data would occupy, or
   a second storage bandwidth that an analysis result of the data would occupy.

14. The method of claim 12, wherein the determining a distribution mode of a current computing bandwidth of the one or more computing modules based on a current storage bandwidth of the one or more storage modules and the required storage bandwidth includes:
   determining whether the required storage bandwidth is larger than the current storage bandwidth; and
   determining the distribution mode of the current computing bandwidth based on the determination result.

15. The method of claim 14, wherein the determining the distribution mode of the current computing bandwidth based on the determination result includes:
   in response to a determination that the required storage bandwidth is less than or equal to the current storage bandwidth, keeping the distribution mode of the current computing bandwidth of the one or more computing modules unchanged.

16. The method of claim 14, wherein the determining the distribution mode of the current computing bandwidth based on the determination result includes:
   in response to a determination that the required storage bandwidth is larger than the current storage bandwidth,
      allocating a portion of the current computing bandwidth to be used to compress the data to be processed, or
      stopping a portion of the current computing bandwidth, such that an updated required storage bandwidth is no larger than the current storage bandwidth.

17. The method of claim 14, wherein the determining the distribution mode of the current computing bandwidth based on the determination result includes:
   in response to determining that the required storage bandwidth is less than or equal to the current storage bandwidth,
      determining a required computing bandwidth based on the data to be processed;
      determining whether the current computing bandwidth is greater than the required computing bandwidth; and
      in response to a determination that the current computing bandwidth is greater than the required computing bandwidth, allocating a portion of the current computing bandwidth to be used to compress the data to be processed or allocating a computing bandwidth that is previously allocated to be used to compress the data to be processed back to the current computing bandwidth.

18. A non-transitory computer readable medium, comprising executable instructions that, when executed by a computing device including at least one processor, one or more storage modules, and one or more computing modules wherein the at least one processor includes a first processor and a second processor in communication with each other;
   the one or more storage modules are connected to the first processor and the second processor respectively via a first connecting component; and
   the one or more computing modules are connected to the first processor and the second processor respectively via a second connecting component, direct the at least one processor to perform a method, the method comprising:
   obtaining data to be processed;
   determining a required storage bandwidth based on the data to be processed; and
   determining a distribution mode of a current computing bandwidth of one or more computing modules based on a current storage bandwidth of one or more storage modules and the required storage bandwidth, wherein the one or more computing modules are configured to process the data to be processed, and
   the current computing bandwidth of the one or more computing modules refers to a currently available computing bandwidth of the one or more computing modules.

* * * * *